US012769148B2

(12) United States Patent
Qi

(10) Patent No.: US 12,769,148 B2
(45) Date of Patent: Oct. 20, 2026

(54) SPECTACLE LENS AND METHOD FOR DESIGNING SPECTACLE LENS

(71) Applicant: HOYA LENS THAILAND LTD., Pathumthani (TH)

(72) Inventor: Hua Qi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 289 days.

(21) Appl. No.: 18/282,973

(22) PCT Filed: Jan. 12, 2022

(86) PCT No.: PCT/JP2022/000620

§ 371 (c)(1),
(2) Date: Sep. 19, 2023

(87) PCT Pub. No.: WO2022/201749

PCT Pub. Date: Sep. 29, 2022

(65) Prior Publication Data

US 2024/0168313 A1 May 23, 2024

(30) Foreign Application Priority Data

Mar. 22, 2021 (JP) ................................ 2021-047163

(51) Int. Cl.
*G02C 7/02* (2006.01)
*G02C 7/06* (2006.01)

(52) U.S. Cl.
CPC ............ *G02C 7/022* (2013.01); *G02C 7/027* (2013.01); *G02C 7/06* (2013.01); *G02C 2202/24* (2013.01)

(58) Field of Classification Search
CPC ...... G02C 2202/24; G02C 7/022; G02C 7/06; G02C 7/061; G02C 7/021; G02C 7/04;
(Continued)

(56) References Cited

U.S. PATENT DOCUMENTS

2017/0131567 A1 5/2017 To et al.
2020/0241325 A1* 7/2020 Chalberg ......... B29D 11/00038
(Continued)

FOREIGN PATENT DOCUMENTS

CN 104678572 A 6/2015
CN 110426860 A 11/2019
(Continued)

OTHER PUBLICATIONS

PCT/JP2022/000620, "English Translation of International Search Report", Mar. 29, 2022, 2 pages.
(Continued)

*Primary Examiner* — Matthew Y Lee
(74) *Attorney, Agent, or Firm* — Oliff PLC

(57) ABSTRACT

There is provided a spectacle lens, including: a base region where a light flux incident from an object-side surface is emitted from an eyeball-side surface and converges on a retina through an eyeball; a plurality of defocus regions in contact with the base region and having a property that the light flux passing through at least a part of the defocus region is incident on a retina as a divergent light; and a first defocus region arrangement portion in which the plurality of defocus regions are arranged in such a manner that a 4 mm diameter circular region including only one defocus region exists in a circle in a planar view of the object-side surface.

14 Claims, 8 Drawing Sheets

(58) Field of Classification Search

CPC ...... G02C 7/024; G02C 7/10; G02C 2202/20; G02C 7/02; G02C 7/027; G02C 7/042; G02C 7/08; G02C 7/16; G02C 7/041; G02C 7/047; G02C 7/049; G02C 7/066; G02C 7/086; G02C 7/105; G02C 7/165; G02C 9/04; G02B 21/08; G02B 3/0037; G02B 3/0043; G02B 3/02; G02B 3/10; B29D 11/00009; B29D 11/00326; B29D 11/00038; B29D 11/00048; B29D 11/00317; B29D 11/00336; B29D 11/00432; B29D 11/00451; B29D 11/0073; B29D 11/00865

See application file for complete search history.

(56) References Cited

U.S. PATENT DOCUMENTS

| | | | | |
|---|---|---|---|---|
| 2021/0382326 | A1* | 12/2021 | Kubota | G02C 7/083 |
| 2021/0387430 | A1 | 12/2021 | Toyoshima | |
| 2022/0082864 | A1 | 3/2022 | Qi et al. | |
| 2022/0107508 | A1* | 4/2022 | Zhou | G02C 7/06 |
| 2022/0146857 | A1* | 5/2022 | Hones, Jr. | B29D 11/00009 |
| 2022/0197058 | A1* | 6/2022 | Suzuki | G02C 7/022 |
| 2022/0350169 | A1* | 11/2022 | Sankaridurg | G02C 7/042 |

FOREIGN PATENT DOCUMENTS

| | | | | | |
|---|---|---|---|---|---|
| CN | 110687689 | A | | 1/2020 | |
| CN | 210514836 | U | * | 5/2020 | G02C 7/02 |
| CN | 110687689 | B | * | 3/2025 | G02C 7/06 |
| JP | 2021005081 | A | | 1/2021 | |
| WO | 2019124354 | A1 | | 6/2019 | |
| WO | 2020078693 | A1 | | 4/2020 | |
| WO | 2020180817 | A1 | | 9/2020 | |

OTHER PUBLICATIONS

PCT/JP2022/000620, "International Preliminary Report on Patentability", Oct. 5, 2023, 6 pages.

EP22774554.4, "Extended European Search Report", Dec. 10, 2024, 9 pages.

* cited by examiner

SPECTACLE LENS AND METHOD FOR DESIGNING SPECTACLE LENS

CROSS-REFERENCE TO RELATED APPLICATIONS

This application is the National Stage of International Application No. PCT/JP2022/000620, filed on Jan. 12, 2022, which claims priority to Japanese Patent Application No. 2021-047163, filed Mar. 22, 2021, and the contents of which are incorporated herein by reference.

BACKGROUND

Technical Field

The present disclosure relates to a spectacle lens and a method for designing the spectacle lens.

Description of Related Art

As a spectacle lens that suppresses a progression of refractive error such as myopia, there is a spectacle lens in which a plurality of island-shaped regions are formed on a lens, the island-shaped regions having a refractive power that is more positive than a prescribed refractive power (see Patent document 1, for example). The spectacle lens according to an embodiment described in Patent document 1 is also called a DIMS (Defocus Incorporated Multiple Segments) spectacle lens, abbreviated as DIMS. Hereinafter, these island-shaped regions are called defocus regions.

Patent document 1: U.S. Application Publication No. 2017/0131567

SUMMARY OF THE DISCLOSURE

Problem to be Solved by the Disclosure

According to the spectacle lens with this configuration disclosed in Patent document 1, in principle, a light flux that incidents from an object-side surface and exits from an eyeball-side surface is focused on a retina of a wearer, and meanwhile, a light flux that has passed through a portion of a defocus region is focused at a position in front of the retina, thereby suppressing the progression of myopia.

An aspect of one embodiment of the present disclosure is to provide a spectacle lens capable of increasing an effect of suppressing the progression of myopia.

Means for Solving the Problem

According to a first aspect of the present disclosure, there is provided a spectacle lens, including:

- a base region where a light flux incident from an object-side surface is emitted from an eyeball-side surface and converges on a retina through an eyeball;
- a plurality of defocus regions in contact with the base region and having a property that the light flux passing through at least a part of the defocus region is incident on a retina as a divergent light; and a first defocus region arrangement portion in which the plurality of defocus regions are arranged in such a manner that a 4 mm diameter circular region including only one defocus region exists in a circle in a planar view of the object-side surface.

According to a second aspect of the present disclosure, there is provided the spectacle lens of the first aspect, wherein the first defocus region arrangement portion is provided on a periphery of the spectacle lens.

According to a third aspect of the present disclosure, there is provided the spectacle lens of the first aspect or the second aspect, wherein in the first defocus region arrangement portion, when a region formed at a center position of the 4 mm diameter circle including only one defocus region is defined as region Z1 in a planar view of the object-side surface, an area of the region Z1 is 25% or more of an area of the first defocus region arrangement portion.

According to a fourth aspect of the present disclosure, there is provided the spectacle lens of any one of the first to third aspects, wherein in the first defocus region arrangement portion, a center-to-center distance a between the adjacent defocus regions and a diameter d of the defocus region satisfy $(d+4\ mm)/2<a<d+4\ mm$.

According to a fifth aspect of the present disclosure, there is provided the spectacle lens of any one of the first to fourth aspects, wherein in the first defocus region arrangement portion, the diameter d of the defocus region is 1.5 mm or more and 3 mm or less.

According to a sixth aspect of the present disclosure, there is provided the spectacle lens of any one of the first to fifth aspects, wherein in the first defocus region arrangement portion, the center-to-center distance a between the adjacent defocus regions is more than 3 mm and less than 7 mm.

According to a seventh aspect of the present disclosure, there is provided the spectacle lens of any one of the first to sixth aspects, wherein the spectacle lens is a myopia progression suppressing lens.

According to an eighth aspect of the present disclosure, there is provided a method for designing a spectacle lens including a base region where a light flux incident from an object-side surface is emitted from an eyeball-side surface and converges on a retina through an eyeball; and a plurality of defocus regions in contact with the base region and having a property that the light flux passing through at least a part of the defocus region is incident on a retina as a divergent light, the method including:

- arranging the plurality of defocus regions in such a manner that a 4 mm diameter circular region including only one defocus region exists in a circle in a planar view of the object-side surface. That is, a defocus region designing process is a process of designing the first defocus region arrangement portion described above.

Advantage of the Disclosure

According to one embodiment of the present disclosure, there is provided a spectacle lens capable of increasing an effect of suppressing the progression of myopia.

DETAILED DESCRIPTION OF THE DISCLOSURE

Finding Acquired by the Present Inventor

First, finding acquired by the present inventor will be described.

An eyeball constantly makes accommodative microtremors and works to focus a light on a retina. Stronger accommodation (corresponding to a backward movement of the retina) results in a high image contrast, and weaker accommodation (corresponding to a forward movement of the retina) results in a low image contrast, and in this case, the image is formed behind the retina. This signal is considered to be a trigger for speeding up eyeball elongation, and in this case, the progression of myopia is accelerated. Conversely, weaker accommodation (corresponding to the forward movement of the retina) results in a high image contrast, and stronger accommodation (corresponding to the backward movement of the retina) results in a low image contrast, and in this case, the image is formed in front of the retina. This signal is considered to be a trigger for slowing eyeball elongation.

That is, it is considered that a change in the contrast of a retinal image due to accommodative microtremors affects a growth speed of the eyeball. The contrast of the retinal image is determined by PSF (Point Spread Function) of an optical system. A spread size of the PSF, that is, the size of a spot (light spot) is a major factor in determining the contrast of the retinal image.

Figure 1:
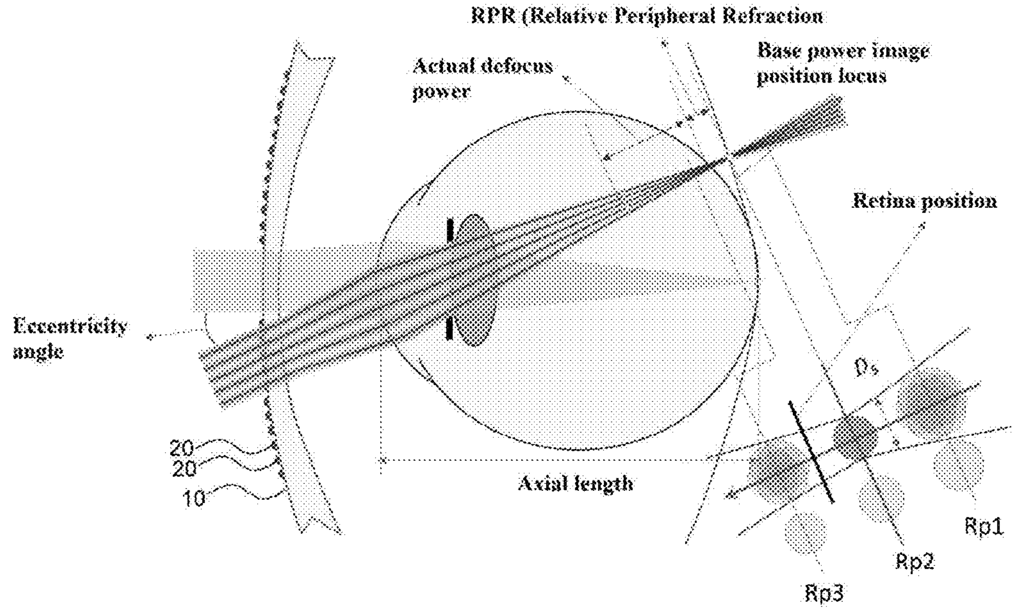
FIG. 1 is a view showing a state in which light rays incident on an eye from a peripheral visual field are converged behind a periphery of a retina, when DIMS described in FIG. 1 of Patent document 1 is worn.

FIG. 1 is a view showing a state in which light rays incident on an eye from a peripheral visual field are converged behind a periphery of the retina, when DIMS described in FIG. 1 of Patent document 1 is worn.

As shown in FIG. 1, DIMS described in Patent document 1 includes a base region 10 and a plurality of defocus regions 20, and is designed such that the plurality of defocus regions 20 exist in a pupillary range. The light flux transmitted through each defocus region 20 is converged in front of the retina, and is defocused. On the other hand, due to the power of the base region 10 and an eye, a plurality of light fluxes transmitted through a plurality of defocus regions 20 converge at a predetermined position to form an overall spot (Ds). Here, in the base region 10, power is set so as to form an image on the retina by the light flux that passes through the base region 10 and the eye and is converged at the center portion of the retina. Meanwhile, in many cases, the light flux is incident on the periphery of the retina, transmits through the base region 10 and the eye, and is converged behind the retina. This is because the curvature of a retinal shape is greater than the curvature of an optical image surface. Accordingly, in the periphery of the retina, the position where the diameter of the overall spot (Ds) is minimum, is also behind the retina in many cases. With stronger accommodation (corresponding to the movement of retina from Rp2 to Rp1) under this situation, each spot becomes larger and is separated at the same time, the spot being formed by the light flux transmitting through the plurality of defocus regions 20 in the pupillary range. Therefore, the overall spot (Ds) becomes larger. This is a situation where the image becomes blurred when elongation of the eyeball occurs. Therefore, it is considered that the effect of suppressing the elongation of the eyeball, that is, the effect of suppressing the progression of myopia can be obtained.

Conversely, with weaker accommodation (corresponding to the movement of retina from Rp2 to Rp3), each spot becomes smaller, the spot being formed by the light flux transmitting through the plurality of defocus regions 20 in the pupillary range, but the overall spot (Ds) becomes larger due to the separation of each spot. Since this is a situation where the image becomes blurred along with contraction of the eyeball, there is a possibility that the effect of suppressing the progression of myopia cannot be obtained.

That is, when a plurality of defocus regions 20 exist in the pupillary range, the elongation of an eye axis can be suppressed to some extent to suppress the progression of myopia, but in the periphery of the retina, the position where the overall diameter of the spot (Ds) is the smallest is behind the retina. Therefore, the elongation of the eye axis cannot be suppressed to reverse the progression of myopia. In this case, theoretically, the change in contrast due to accommodative microtremors promotes elongation of the retina to bring it closer to the position of Rp2.

Regarding the above-described problems, earnest study by the inventor of the present disclosure reveals that by designing the spectacle lens so that only one defocus region exists in the pupillary range, the effect of suppressing the progression of myopia can be increased.

Figure 2:
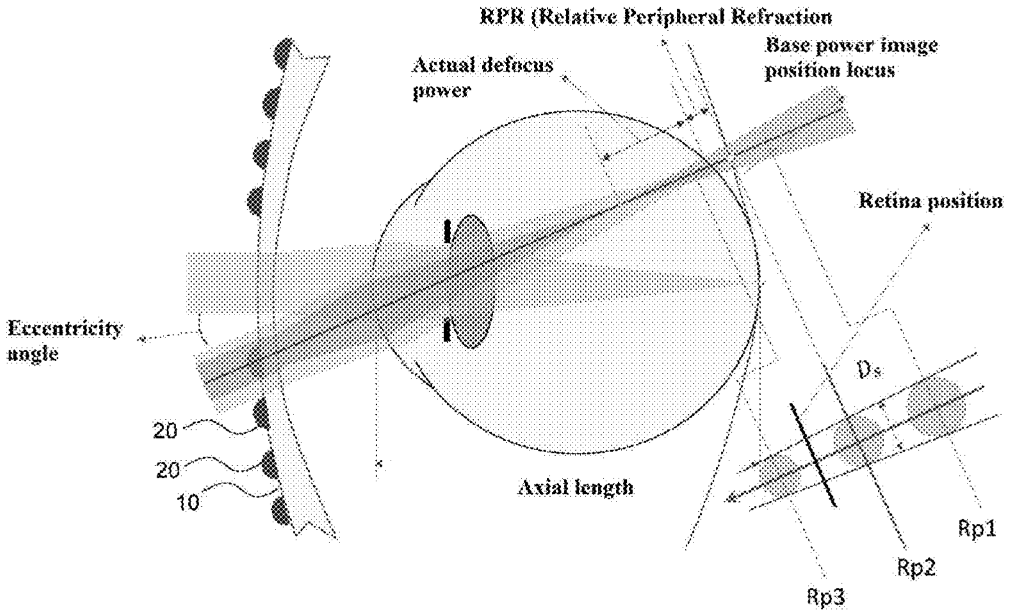
FIG. 2 is a view showing a state in which light rays incident on the eye from the peripheral visual field are converged behind the periphery of the retina when the spectacle lens according to one embodiment of the present disclosure is worn.

FIG. 2 is a view showing a state in which light rays incident on the eye from the peripheral visual field are converged behind the periphery of the retina when the spectacle lens according to the embodiment of the present disclosure is worn.

As shown in FIG. 2, in the spectacle lens according to one embodiment of the present disclosure, a plurality of defocus regions 20 larger in size than those in FIG. 1 are sparsely arranged so that only one defocus region 20 exists in the pupillary range. With stronger accommodation (corresponding to the movement of retina from Rp2 to Rp1) under this situation, the spot becomes larger, the spot being formed by the light flux transmitted through the defocus region 20 in the pupillary range. Since this is a situation where the image becomes blurred along with elongation of the eyeball, the effect of suppressing the progression of myopia can be obtained.

Further, with weaker accommodation (corresponding to movement of retina from Rp2 to Rp3), the spot becomes smaller, the spot being formed by the light flux transmitted through the defocus region 20 in the pupillary range. Since this is also a situation where elongation of the eyeball is suppressed, the effect of suppressing the progression of myopia can be obtained.

For the light rays incident on the periphery of the retina as in FIGS. 1 and 2, the image position Rp2 is often behind the retina in an unaccommodated state. In this case also, theoretically, the change in contrast due to accommodative microtremors suppresses elongation of the retina so as to be in front of Rp2.

The spectacle lens according to one embodiment of the present disclosure does not allow the problem to occur, such that the position where the spot (Ds) is minimized is behind the retina, the spot being formed by an entire light flux transmitting through the plurality of defocus regions 20, despite the fact that the defocus regions 20 impart defocusing so that the light flux is converged in front of the retina. Therefore, the effect of suppressing the progression of myopia is not impaired, and the effect of suppressing the progression of myopia can be increased as compared with the DIMS described in Patent document 1.

Details of the Embodiment of the Present Disclosure

Next, one embodiment of the present disclosure will be described below with reference to the drawings. The present disclosure is not limited to these examples, but is indicated by the scope of the claims, and is intended to include all modifications within the meaning and scope of equivalents of the scope of the claims.

The contents not described in this specification are all described in Patent document 1, and the contents not described in Patent document 1 (especially the contents related to the manufacturing method) are all described in WO2020/004551. When there is a discrepancy between the description of Patent document 1 and the description of the publication, the description of the publication takes precedence.

The spectacle lens described herein has an object-side surface and an eyeball-side surface. The “object-side surface” means a surface located on the object-side when a spectacle having spectacle lenses are worn by a wearer, and the “eyeball-side surface” is the opposite, ie the surface that is located on the eyeball-side when the a spectacle having spectacle lenses are worn by the wearer. This relationship also applies to a lens substrate that serves as the basis of the spectacle lens. That is, the lens substrate also has the object-side surface and the eyeball-side surface.

First Embodiment of the Present Disclosure (1) Spectacle Lens

Figure 3:
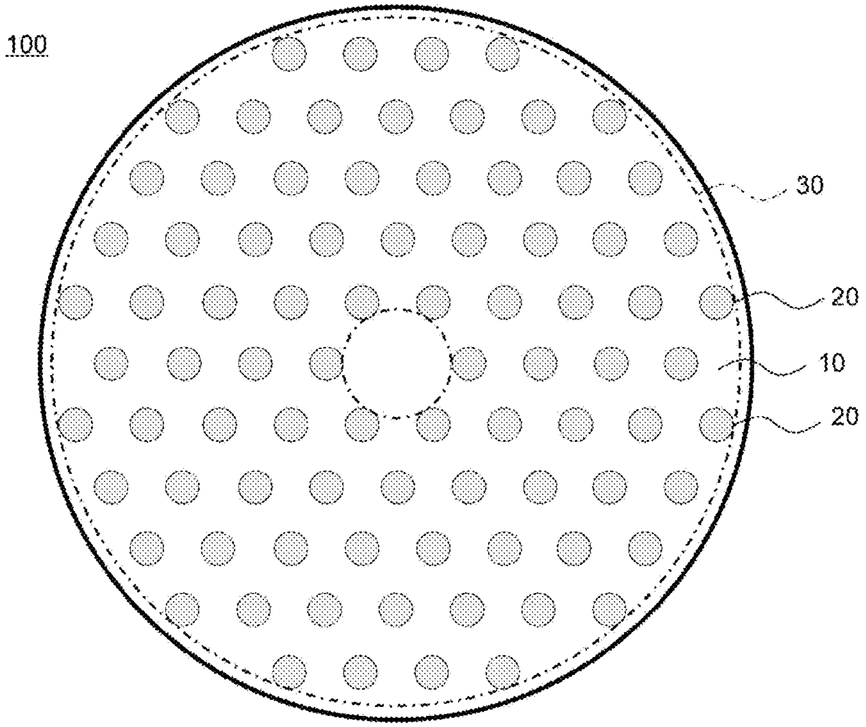
FIG. 3 is a plan view of an object-side surface of a spectacle lens 100 according to a first embodiment of the present disclosure.

FIG. 3 is a plan view of the object-side surface of the spectacle lens 100 of the present embodiment. The spectacle lens 100 of the present embodiment includes a base region 10 and a plurality of defocus regions 20. The base region 10 is configured such that the light flux incident from the object-side surface is emitted from the eyeball-side surface and passes through the eyeball and is converged on the retina. The defocus region 20 is in contact with the base region 10, with a configuration such that the light flux passing through at least a part of the defocus region 20 is incident on the retina as a divergent light.

The base region 10 is a portion having a shape capable of achieving a wearer’s prescribed refractive power, being a portion corresponding to a first refractive region of Patent document 1.

The defocus region 20 is the region in which at least a part of the region does not allow a base power image to be converged to a converging position. The defocus regions 20 are portions corresponding to the minute protrusions of Patent document 1. The spectacle lens 100 of the present embodiment is a myopia progression suppressing lens, similarly to the spectacle lens described in Patent document 1. The plurality of defocus regions 20 of the present embodiment may be formed on at least one of the object-side surface or the eyeball-side surface of the spectacle lens 100, similarly to the minute protrusions of Patent document 1. For example, the present embodiment provides a case where a plurality of defocus regions 20 are provided only on the object-side surface of the spectacle lens 100.

The surface shape of the defocus region 20 is not particularly limited. The defocus region 20 may have a spherical shape, an aspherical shape, a toric surface shape, or a mixed shape thereof. For example, the present embodiment provides a case where the defocus region 20 has a spherical shape.

The number of the plurality of defocus regions 20 included in the spectacle lens 100 is not particularly limited, but is, for example, 20 or more and 500 or less.

The plurality of defocus regions 20 are arranged, for example, in island shapes (that is, separated from each other without adjacent each other). An arrangement mode of the plurality of defocus regions 20 is not particularly limited. For example, as shown in FIG. 3, the present embodiment provides a case where each defocus region 20 is sparsely arranged independently so that the center of each defocus region 20 becomes the vertex of an equilateral triangle (hereinafter also referred to as an equilateral triangle arrangement).

As shown in FIG. 10 of Patent document 1, the defocus region 20 may be formed in the center portion of the spectacle lens 100, or the defocus region 20 may not be formed in the center portion of the spectacle lens 100 as described in FIG. 1. As shown in FIG. 3, for example, the present embodiment provides a case where the defocus region 20 is not formed in the center portion of the spectacle lens 100. In this specification, the center portion of the spectacle lens 100 means the center of the lens (geometric center, optical center, or centering center) of the spectacle lens 100 and the vicinity thereof. For example, the present embodiment provides a case where the line of sight of the wearer of the spectacle lens 100 passes through the center of the lens when viewed from the front.

As shown in FIG. 3, the spectacle lens 100 has a first defocus region arrangement portion 30. The first defocus region arrangement portion 30 may be a portion, for example, from the circumference centered on the lens center of the spectacle lens 100 and contacting the defocus region 20 closest to the center of the lens, to the circumference contacting the defocus region 20 furthest from the center of the lens. A plurality of defocus regions 20 are arranged in the first defocus region arrangement portion 30, so that a 4 mm diameter circular region including only one defocus region 20 exists in a circle in a planar view of the object-side surface of the spectacle lens 100. Here, the 4 mm diameter circular region represents the pupillary range of the wearer. That is, the first defocus region arrangement portion 30 is designed with an intention of including only one defocus region 20 in the pupillary range. Thereby, the effect of suppressing the progression of myopia can be obtained without forming the spot (Ds) behind the retina by an entire light flux that has passed through the plurality of defocus regions 20, thereby increasing the effect of suppressing the progression of myopia.

In the first defocus region arrangement portion 30, it is not required to arrange the defocus regions 20 so that only one defocus region 20 is included in every 4 mm diameter circle in a planar view of the object-side surface. From a viewpoint of efficiently increasing the effect of suppressing the progression of myopia, it is preferable that the region formed at a center position of the 4 mm diameter circle including only one defocus region 20, occupies 25% or more (more preferably 50% or more, still more preferably 70% or more) of the first defocus region arrangement portion 30.

Also, it is preferable that the first defocus region arrangement portion 30 is provided in the periphery of the spectacle lens 100. In this specification, the periphery of the spectacle lens 100 means the region outside the region where light passing through the center of the retina passes through the lens when the wearer of the spectacle lens 100 performs eyeball rotation in a range of a daily visual behavior. That is, in the range of a daily visual behavior, the light passing through the periphery of the spectacle lens 100 always reaches the periphery of the retina. Specifically, the periphery of the spectacle lens 100 may be, for example, a circumference of 10 mm (or 20 mm) in diameter from the center of the lens and a region outside thereof in a planar view of the object-side surface of the spectacle lens 100. Light reaching the retinal periphery has a large effect on the suppression of the progression of myopia, and therefore by providing the first defocus region arrangement portion 30 in the periphery of the spectacle lens 100, the effect of suppressing the progression of myopia can be increased. Further, the periphery of the spectacle lens 100 is a region for peripheral vision in the range of a daily visual behavior, and therefore by providing the first defocus region arrangement portion 30 in the periphery of the spectacle lens 100, the problem of affecting a vision through the spectacle lens 100 due to arrangement of defocus regions 20, can be reduced.

Figure 4A:
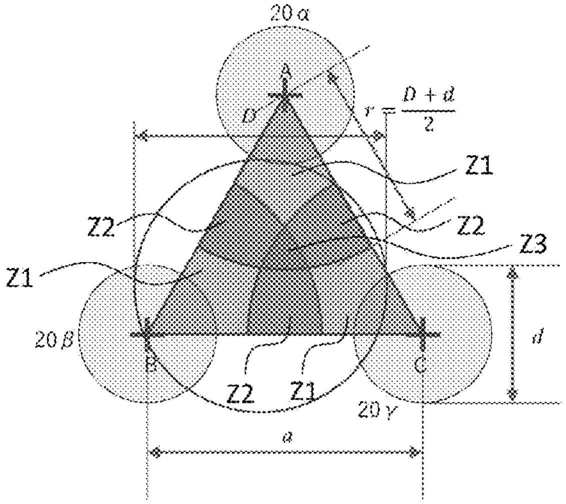
FIGS. 4A and 4B are enlarged plan views of a first defocus region arrangement portion 30 of the spectacle lens 100 according to the first embodiment of the present disclosure.
Figure 4B:
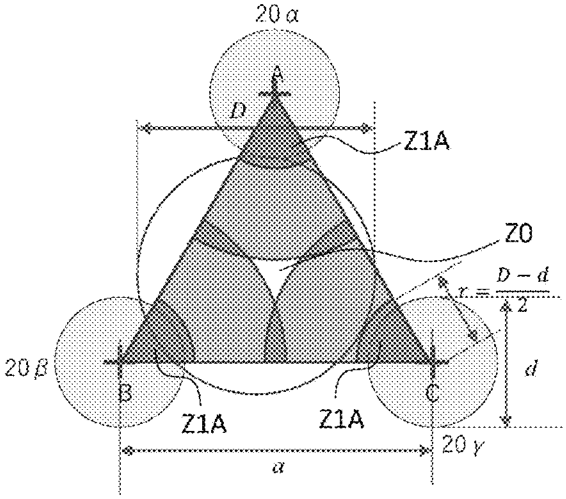

FIGS. 4A and 4B are enlarged plan views of the first defocus region arrangement portion 30 of the spectacle lens 100 according to the present embodiment. In FIGS. 4A and 4B, a plurality of defocus regions 20 are arranged in an equilateral triangle, and the regions other than the three adjacent defocus regions 20 are omitted. In the first defocus region arrangement portion 30, the number of defocus regions 20 included in the 4 mm diameter circle changes depending on a center position of the 4 mm diameter circle (that is, corresponding to the center of the pupil) in a planar view of the object-side surface. Therefore, when the center of the 4 mm diameter circle moves in an equilateral triangle range consisting of the centers of three adjacent defocus regions 20, the number of defocus regions 20 included in the 4 mm diameter circle, is calculated. That is, when the center of the pupil moves through the equilateral triangle range, the number of defocus regions 20 included in the pupillary range, is calculated. Hereinafter, the diameter of the defocus region 20 is defined as d, the center-to-center distance between the adjacent defocus regions 20 is defined as a, and the pupil diameter is defined as D (=4 mm).

When the center-to-center distance a between the adjacent defocus regions 20 satisfies $(D+d)/2<a<(D+d)$, and as shown in FIG. 4A, when the center of the pupil is in a fan-shaped region with a radius of $r=(D+d)/2$ from the center A of the defocus region 20$\alpha$, at least a part of the defocus region 20$\alpha$ is included in the pupillary range. Further, when the center of the pupil is in a fan-shaped region with a radius of $r=(D+d)/2$ from the center B of the defocus region 20$\beta$, at least a part of the defocus region 20$\beta$ is included in the pupillary range. Further, when the center of the pupil is in a fan-shaped region with a radius of $r=(D+d)/2$ from the center C of the defocus area 207, at least a part of the defocus region 207 is included in the pupillary range. Accordingly, region Z3 where the three fan-shaped regions overlap is a region formed at a pupil center position including three defocus regions 20 in the pupillary range. Further, region Z1 where the two fan-shaped regions overlap is a region formed at the pupil center position including two defocus regions 20 in the pupillary range. Further, region Z1 where the fan-shaped regions do not overlap is a region formed at the pupil center position including only one defocus region 20 in the pupillary range.

As shown in FIG. 4B, depending on the value of the diameter d of the defocus region 20 and the value of the center-to-center distance a between the adjacent defocus regions 20, the region Z3 may not exist and region Z0 which is not included in any fan-shaped region may exist. That is, the region Z0 is the region formed at the pupil center position where no defocus region 20 is included in the pupillary range. Further, as shown in FIG. 4B, when the center of the pupil is in the fan-shaped region with a radius of $r=(D-d)/2$ from the center of the defocus region 20$\alpha$, an entire defocus region 20$\alpha$ is included in the pupillary range. Thus, in the region Z1, region Z1A is formed at the pupil center position where one of the defocus regions 20 is entirely included in the pupillary range.

In the first defocus region arrangement portion 30, a large proportion of the region Z1 is preferable from a viewpoint of efficiently increasing the effect of suppressing the progression of myopia. Further, small proportions of the region Z2, the region Z3 and the region Z0 are preferable. Further, in the region Z1, a large proportion of the region Z1A is preferable.

In the first defocus region arrangement portion 30, it is preferable that the area of the region Z1 (the region formed at the center position of the 4 mm diameter circle including only one defocus region 20 in a planar view of the object-side surface) is 25% or more (more preferably 50% or more) of the area of the first defocus region arrangement portion 30. Thereby, the effect of suppressing the progression of myopia can be increased. When calculating the areas of the first defocus region arrangement portion 30 and the region Z1, a polygonal range consisting of the centers of the plurality of adjacent defocus regions 20 (in this embodiment, in an equilateral triangular range consisting of the centers of three adjacent defocus regions 20) may be applied to an entire first defocus region arrangement portion 30. The same applies when calculating the areas of the region Z2, the region Z3, the region Z0, and the region Z1A.

In the first defocus region arrangement portion 30, the region Z2 (that is, the region formed at the center position of the 4 mm diameter circle including two defocus regions 20 in a planar view of the object-side surface) is preferably 50% or less of the area of the first defocus region arrangement portion 30. Thereby, the effect of suppressing the progression of myopia can be increased.

In the first defocus region arrangement portion 30, the region Z3 (that is, the region formed at the center position of the 4 mm diameter circle including three or more defocus regions 20 in a planar view of the object-side surface) is preferably 20% or less of the area of the first defocus region arrangement portion 30. Thereby, the effect of suppressing the progression of myopia can be increased.

In the first defocus region arrangement portion 30, the region Z0 (that is, the region formed at the center position of the 4 mm diameter circle not including any defocus region 20 in a planar view of the object-side surface) is preferably 10% or less (more preferably 5% or less, even more preferably 0%) of the area of the first defocus region arrangement portion 30. Thereby, the effect of suppressing the progression of myopia can be increased.

In the first defocus region arrangement portion 30, the region Z1A (that is, the region formed at the center position of the 4 mm diameter circle including all of the defocus regions 20 in a planar view of the object-side surface) is preferably 3% or more (more preferably 5% or more, still more preferably 10% or more) of the area of the region Z1. Thereby, the effect of suppressing the progression of myopia can be increased.

In the first defocus region arrangement portion 30, the center-to-center distance a between the adjacent defocus regions 20 and the diameter d of the defocus region preferably satisfy (d+4 mm)/2<a<d+4 mm (that is, (D+d)/2<a<D+d). Thereby, in the first defocus region arrangement portion 30, a sufficiently large proportion of the region Z1, and sufficiently small proportions of the regions Z2, Z3 and Z0 are realized. Accordingly, the effect of suppressing the progression of myopia can be increased.

In the first defocus region arrangement portion 30, the diameter d of the defocus region 20 is preferably 1.5 mm or more and 3 mm or less. When the diameter d is less than 1.5 mm, the area proportion of the defocus region 20 in the pupillary range becomes too small, thereby possibly decreasing the effect of suppressing the progression of myopia. In contrast, by setting the diameter d to 1.5 mm or more, the area proportion of the defocus region 20 in the pupillary range becomes appropriately large, thereby increasing the effect of suppressing the progression of myopia. On the other hand, when the diameter d exceeds 3 mm, the area proportion of the defocus region 20 in the pupillary range becomes too large, thereby posing a problem of affecting a vision through the spectacle lens 100. In contrast, by setting the diameter d to 3 mm or less, the area proportion of the defocus region 20 in the pupillary range becomes appropriately small, thereby reducing the influence on the vision through the spectacle lens 100.

In the first defocus region arrangement portion 30, the center-to-center distance a between the adjacent defocus regions 20 is preferably more than 3 mm and less than 7 mm. When the center-to-center distance a is 3 mm or less, the proportions of the region Z2 and the region Z3 in the first defocus region arrangement portion 30 become large, thereby possibly decreasing the effect of suppressing the progression of myopia. On the other hand, by setting the center-to-center distance a to more than 3 mm, the proportions of the region Z2 and the region Z3 in the first defocus region arrangement portion 30 become small, thereby increasing the effect of suppressing the progression of myopia. On the other hand, when the center-to-center distance a is 7 mm or more, the proportion of the region Z0 in the first defocus region arrangement portion 30 becomes large, thereby possibly decreasing the effect of suppressing the progression of myopia. In contrast, by setting the center-to-center distance a to less than 7 mm, the proportion of the region Z0 in the first defocus region arrangement portion 30 becomes small, thereby increasing the effect of suppressing the progression of myopia.

(2) Method for Designing a Spectacle Lens

The present disclosure can also be applied to a method for designing the spectacle lens 100. There is provided the method for designing the spectacle lens 100 including a base region 10 where a light flux incident from an object-side surface is emitted from an eyeball-side surface and converges on a retina through an eyeball; a plurality of defocus regions 20 in contact with the base region 10 and having a property that the light flux passing through at least a part of the defocus region 20 is incident on a retina as a divergent light; the method including:

arranging the plurality of defocus regions 20 in such a manner that a 4 mm diameter circular region including only one defocus region 20 exists in a circle in a planar view of the object-side surface. That is, a defocus region designing process is a process of designing the first defocus region arrangement portion 30 described above. The details of the defocus region designing process are omitted because they overlap with the above-described (1) spectacle lens.

Second Embodiment of the Present Disclosure

Next, a second embodiment of the present disclosure will be described, focusing on a point different from the first embodiment. Elements that are substantially the same as those described in the first embodiment are denoted by the same reference numerals, and descriptions thereof are omitted.

Figure 5:
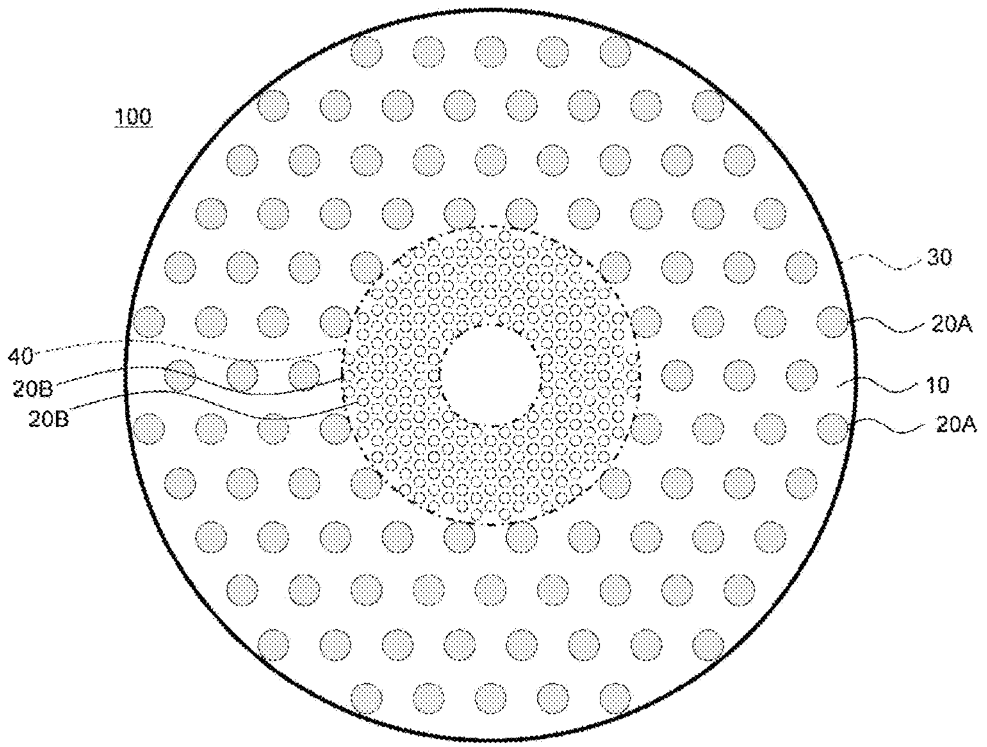
FIG. 5 is a plan view of the object-side surface of the spectacle lens 100 according to another embodiment of the present disclosure.

FIG. 5 is a plan view of the object-side surface of the spectacle lens 100 according to the second embodiment of the present disclosure. As shown in FIG. 5, the spectacle lens 100 of the present embodiment has a first defocus region arrangement portion 30 and a second defocus region arrangement portion 40. The second defocus region arrangement portion 40 is provided closer to the center of the lens than the first defocus region arrangement portion 30, being the region in which a plurality of defocus regions 20 are arranged so that the plurality of defocus regions 20 (for example, 4 or more and 7 or less) are included in the 4 mm diameter circle in a planar view of the object-side surface of the spectacle lens 100. Hereinafter, out of the plurality of defocus regions 20 of the spectacle lens 100, the defocus region 20 arranged so that only one defocus region 20 is included in the 4 mm diameter circle is distinguished as defocus region 20A, and the defocus region 20 arranged so that a plurality of defocus regions 20 (for example, 4 or more and 7 or less) are included in the 4 mm diameter circle is distinguished as defocus region 20B in a planar view of the object-side surface of the spectacle lens 100.

In the present embodiment, the first defocus region arrangement portion 30 may be, for example, a portion from the circumference contacting the defocus region 20A centered on the lens center of the spectacle lens 100 and closest to the lens center, to the circumference contacting the defocus area 20A farthest from the center of the lens. Further, the second defocus region arrangement portion 40 may be, for example, a portion from the circumference contacting the defocus region 20B centered on the lens center of the spectacle lens 100 and closest to the lens center, to the circumference contacting the defocus region 20B farthest from the center of the lens.

The diameter $d_B$ of the defocus region 20B in the second defocus region arrangement portion 40 is smaller than the diameter d of the defocus region 20A in the first defocus region arrangement portion 30. Further, the center-to-center distance $a_B$ between the adjacent defocus regions 20B in the second defocus region arrangement portion 40 is smaller than the center-to-center distance a between the adjacent defocus regions 20A in the first defocus region arrangement portion 30. Specifically, in the second defocus region arrangement portion 40, the diameter $d_B$ of the defocus region 20B is, for example, 0.6 mm or more and 1.5 mm or less, and the center-to-center distance $a_B$ between the adjacent defocus areas 20B is, for example, 1.0 mm or more and 2.0 mm or less.

In the spectacle lens 100 of the present embodiment, the second defocus region arrangement portion 40 is provided at a position closer to the center of the lens. Further, in the second defocus region arrangement portion 40, a plurality of defocus regions 20B having a smaller size than in the first defocus region arrangement portion 30 are densely arranged. Therefore, the second defocus region arrangement portion 40 may have less influence on the vision through the spectacle lens 100 than the first defocus region arrangement portion 30. Accordingly, the spectacle lens 100 of the present embodiment may reduce the influence on the vision through the spectacle lens 100, compared to the spectacle lens 100 of the first embodiment described above. Further, the spectacle lens 100 of the present embodiment includes the first defocus region arrangement portion 30 in the periphery of the spectacle lens 100, similarly to the spectacle lens 100 of the first embodiment described above, thereby increasing the effect of suppressing the progression of myopia.

Other Embodiments of the Present Disclosure

Although the embodiments of the present disclosure have been specifically described above, the present disclosure is not limited to the above-described embodiments, and various modifications can be made without departing from the scope of the disclosure.

For example, in the above-described embodiment, explanation is given for the case of constant diameter d and center-to-center distance a of the plurality of defocus regions 20 in the first defocus region arrangement portion 30. However, in the first defocus region arrangement portion 30, changed diameter d and center-to-center distance a of the plurality of defocus regions 20 may be acceptable. Specifically, for example, the diameter d and the center-to-center distance a of the defocus region 20 may be increased from the center of the spectacle lens 100 toward the periphery.

EXAMPLES

Next, examples according to the present disclosure will be described. These examples are examples of the present disclosure, and the present disclosure is not limited by these examples.

Example 1

Figure 6A:
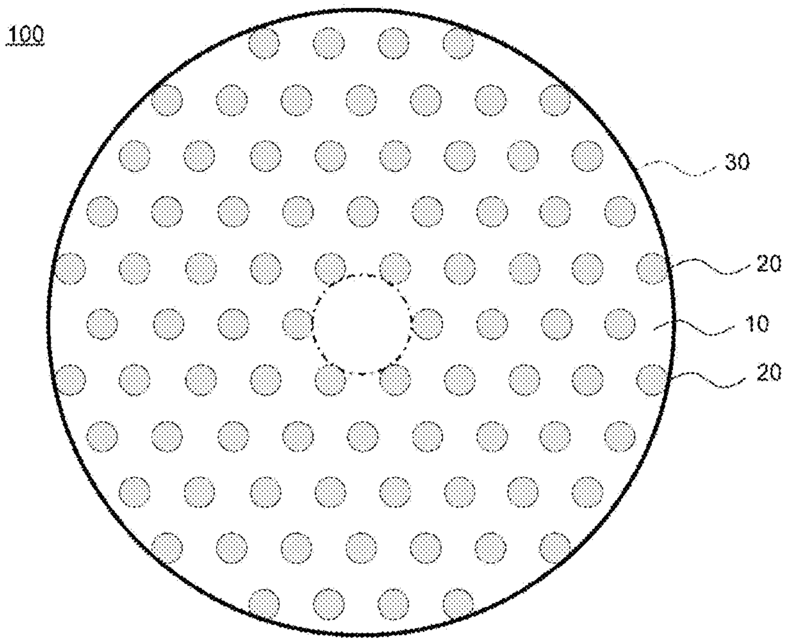
FIG. 6A is a plan view of the object-side surface of the spectacle lens 100 according to example 1.

FIG. 6A is a plan view of the object-side surface of the spectacle lens 100 according to example 1. In example 1, a circumference with a radius of 4.6 mm from the center of the lens and the outer side thereof were defined as the first defocus region arrangement portion 30. In the first defocus region arrangement portion 30, a plurality of defocus regions 20 were arranged in an equilateral triangle, and the shape of each defocus region 20 was spherical. Further, the diameter d of the defocus region 20 was set to 2.8 mm, and the center-to-center distance a between the adjacent defocus regions 20 was set to 6 mm.

Figure 6B:
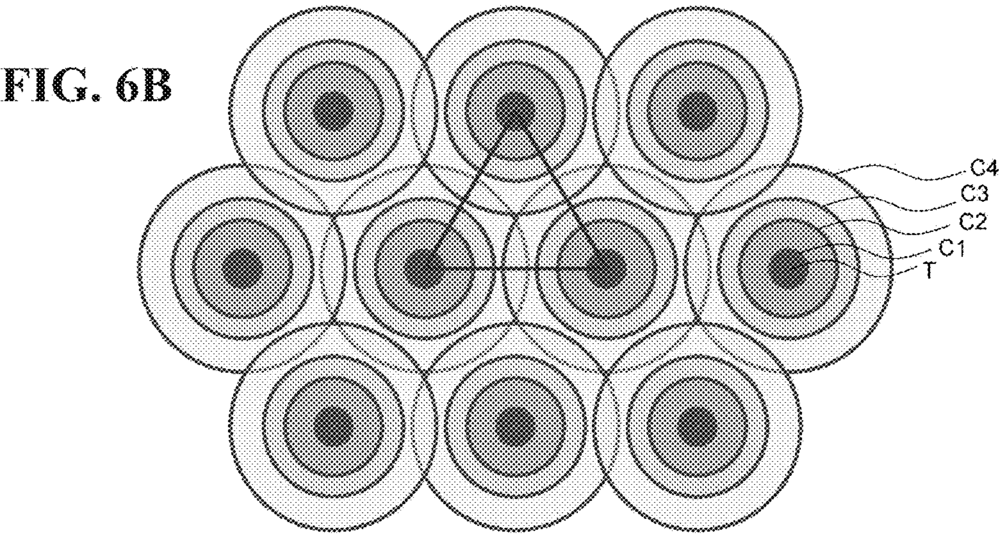
FIG. 6B is an enlarged plan view of the first defocus region arrangement portion 30 of the spectacle lens 100 according to example 1.

FIG. 6B is an enlarged plan view of the first defocus region arrangement portion 30 of the spectacle lens 100 according to example 1. In FIG. 6B, a line indicating a boundary between the base region 10 and the defocus region 20 is omitted. In the first defocus region arrangement portion 30 of the spectacle lens 100, the number of defocus regions 20 included within a 4 mm diameter circle was calculated when the center of the 4 mm diameter circle moved in an equilateral triangle range consisting of the centers of three adjacent defocus regions 20. That is, the number of defocus regions 20 included in a pupillary range was calculated when the center of a pupil moved in the equilateral triangle range shown in FIG. 6B. In FIG. 6B, T indicates the center of the defocus region 20, and a circle C1 centered at T indicates a region (region Z1A) in which one of the defocus regions 20 is entirely included in the pupillary range. Further, a circle C2 centered at T indicates a region (hereinafter referred to as region Z1B) in which 50% or more of one of the defocus regions 20 is included in the pupillary range. Further, a circle C3 centered at T indicates a region (hereinafter referred to as region Z1C) in which 25% or more of one of the defocus regions 20 is included in the pupillary range. Further, a circle C4 centered at T indicates a region (region Z1) in which one of the defocus regions 20 is included in the pupillary range. Then, the area proportions of the region Z1, the region Z2, the region Z3, the region Z0, the region Z1A, the region Z1B, and the region Z1C in the range of the equilateral triangle were calculated. Table 1 shows the results.

TABLE 1

| Example 1 | | | | |
|---|---|---|---|---|
| | Equilateral triangle area = 15.59 $mm^2$ | | | |
| Region | Number of defocus regions in pupillary range | | Area ($mm^2$) | Proportion (%) |
| Z0 | 0 | | 0.022 | 0.1397 |
| Z1 | 1 | 0% or more | 12.975 | 83.2344 |
| Z1C | | 25% or more | 8.31 | 53.3055 |
| Z1B | | 50% or more | 4.021 | 25.7963 |
| Z1A | | 100% | 0.565 | 3.6276 |
| Z2 | 2 | | 2.592 | 16.6259 |
| Z3 | 3 | | 0 | 0 |

As shown in Table 1, in the spectacle lens 100 according to example 1, the area proportion of the region Z1 was 83.2344%, which was sufficiently large. Accordingly, it was confirmed that the spectacle lens 100 according to example 1 could efficiently increase the effect of suppressing the progression of myopia.

Example 2

Figure 7A:
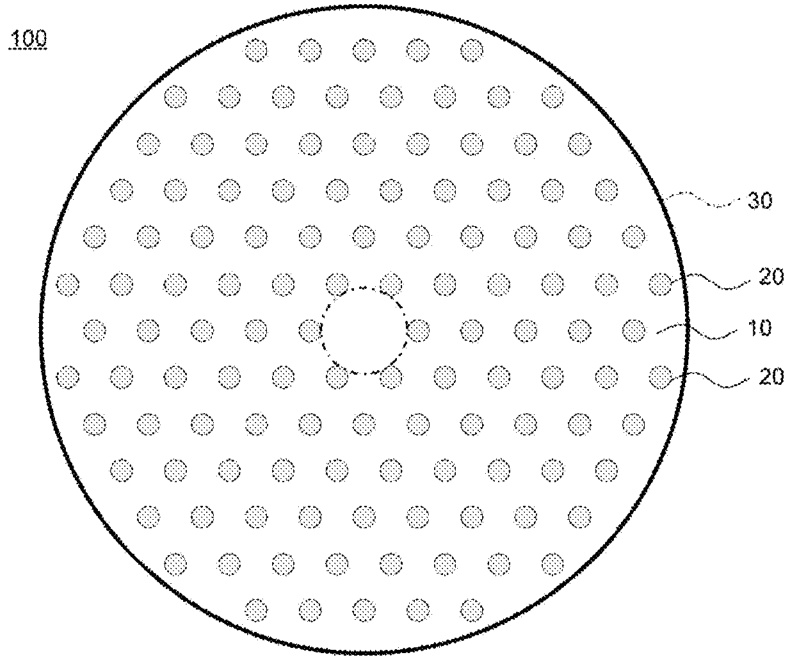
FIG. 7A is a plan view of the object-side surface of the spectacle lens 100 according to example 2.

FIG. 7A is a plan view of the object-side surface of the spectacle lens 100 according to example 2. In example 2, a circumference with a radius of 4 mm from the center of the lens and the outer side thereof were defined as the first defocus region arrangement portion 30. In the defocus region arrangement portion 30, a plurality of defocus regions 20 were arranged in an equilateral triangle, and the shape of each defocus region 20 was spherical. Further, the diameter d of the defocus region 20 was set to 2.0 mm, and the center-to-center distance a between the adjacent defocus regions 20 was set to 6 mm.

Figure 7B:
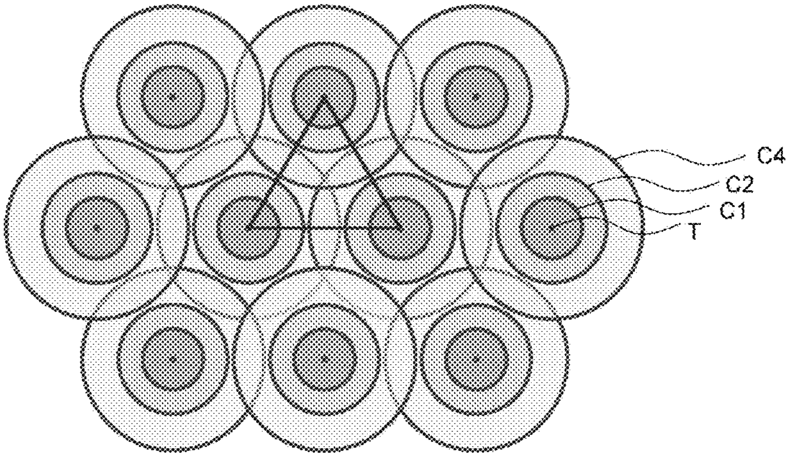
FIG. 7B is an enlarged plan view of the first defocus region arrangement portion 30 of the spectacle lens 100 according to example 2.

FIG. 7B is an enlarged plan view of the first defocus region arrangement portion 30 of the spectacle lens 100 according to example 2. In FIG. 7B, the line indicating the boundary between the base region 10 and the defocus region 20 is omitted. In the first defocus region arrangement portion 30 of the spectacle lens 100 according to example 2, the number of defocus regions 20 included within the 4 mm diameter circle was calculated when the center of the 4 mm diameter circle moved in an equilateral triangle range consisting of the centers of three adjacent defocus regions 20. That is, the number of defocus regions 20 included in the pupillary range was calculated when the center of the pupil moved in the equilateral triangular range shown in FIG. 7B. In FIG. 7B, T indicates the center of the defocus region 20, and a circle C1 centered at T indicates a region (region Z1A) in which one of the defocus regions 20 is entirely included in the pupillary range. Further, a circle C2 centered at T indicates a region (region Z1B) in which 50% or more of one of the defocus regions 20 is included in the pupillary range. Further, a circle C4 centered at T indicates a region (region Z1) in which one of the defocus regions 20 is included in the pupillary range. Then, the area proportions of the region Z1, the region Z2, the region Z3, the region Z0, the region Z1A, and the region Z1B in the range of the equilateral triangle were calculated. Table 2 shows the results.

TABLE 2

| Example 2 | | | |
|---|---|---|---|
| | Equilateral triangle area = 10.83 $mm^2$ | | |
| Region | Number of defocus regions in pupillary range | Area ($mm^2$) | Proportion (%) |
| Z0 | 0 | 0 | 0 |
| Z1 | 1 0% or more | 7.578 | 70.0006 |
| Z1B | 50% or more | 5.0894 | 47.0137 |
| Z1A | 100% | 1.5708 | 14.5104 |
| Z2 | 2 | 3.1832 | 29.4053 |
| Z3 | 3 | 0.0643 | 0.5941 |

As shown in Table 2, in the spectacle lens 100 according to example 2, the area proportion of the region Z1 was 70.0006%, which was sufficiently large. Accordingly, it was confirmed that in the spectacle lens 100 according to example 2 also, the effect of suppressing the progression of myopia can be efficiently increased. Further, in the spectacle lens 100 according to example 2, the area proportion of the region Z1A was larger than that in the spectacle lens 100 according to example 1. Accordingly, it was confirmed that in the spectacle lens 100 according to example 2, the effect of suppressing the progression of myopia may be increased compared to the spectacle lens 100 according to example 1.

Example 3

Figure 8A:
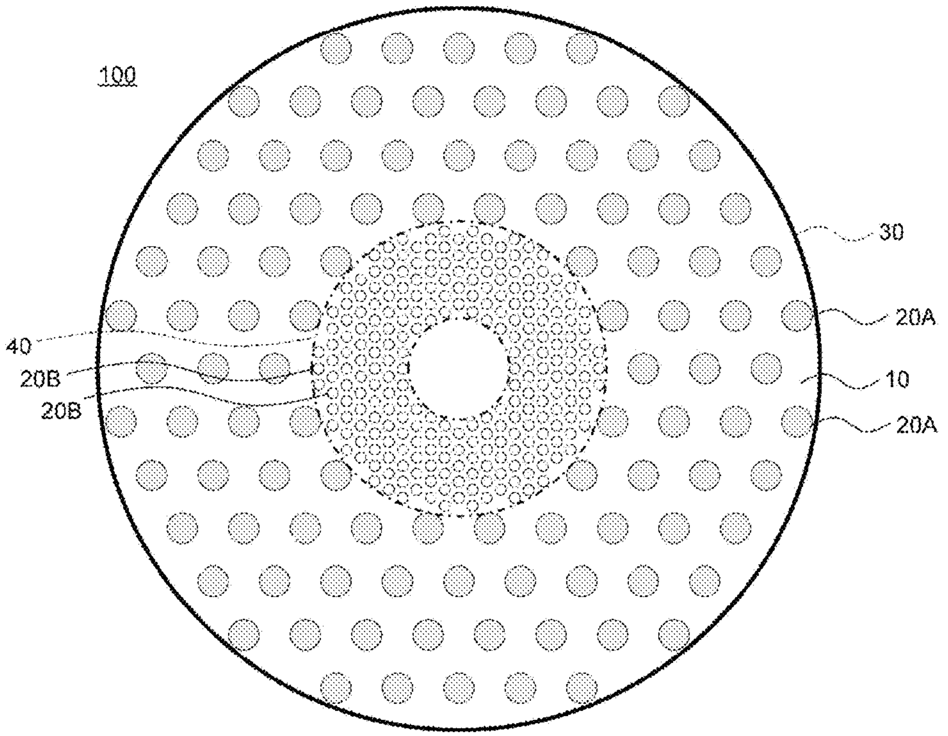
FIG. 8A is a plan view of the object-side surface of the spectacle lens 100 according to example 3.

FIG. 8A is a plan view of the object-side surface of the spectacle lens 100 according to example 3. In example 3, a circumference with a radius of 13.7 mm from the center of the lens and the outer side thereof were defined as the first defocus region arrangement portion 30. In the first defocus region arrangement portion 30, a plurality of defocus regions 20A were arranged in an equilateral triangle, and the shape of each defocus region 20A was spherical. Further, a portion surrounded by a circle with a radius of 4.7 mm and a circle with a radius of 13.7 mm from the center of the lens was defined as a second defocus region arrangement portion 40, and in the second defocus region arrangement portion 40, a plurality of defocus regions 20B were arranged in an equilateral triangle, and the shape of each defocus region 20B was spherical. In the first defocus arrangement portion 30, the diameter d of the defocus region 20A was set to 2.8 mm, and the center-to-center distance a between the adjacent defocus regions 20A was set to 5.7 mm. Further, in the second defocus region arrangement portion 40, the diameter $d_B$ of the defocus region 20B was set to 1.0 mm, and the center-to-center distance $a_B$ between the adjacent defocus regions 20B was set to 1.5 mm.

Figure 8B:
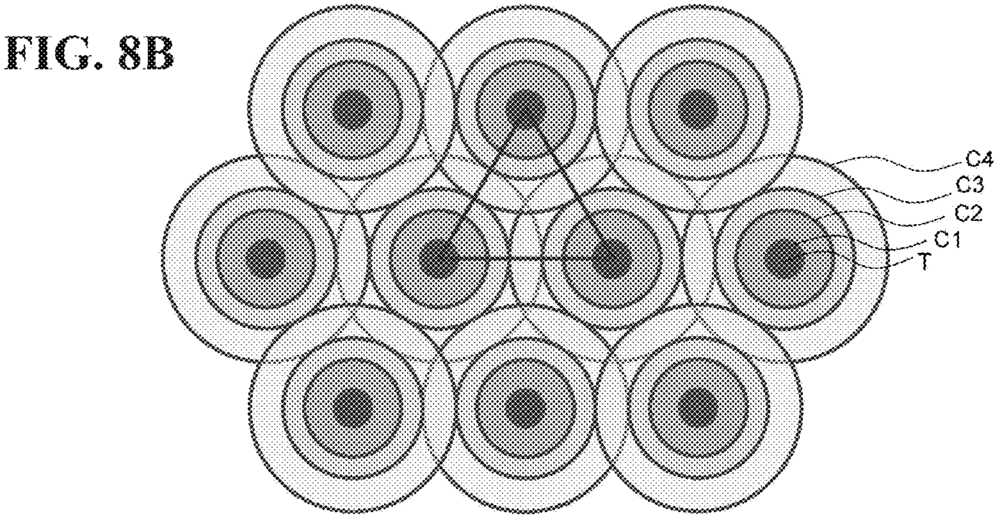
FIG. 8B is an enlarged plan view of the first defocus region arrangement portion 30 of the spectacle lens 100 according to example 3.

FIG. 8B is an enlarged plan view of the first defocus region arrangement portion 30 of the spectacle lens 100 according to example 3. In FIG. 8B, the line indicating the boundary between the base region 10 and the defocus region 20 is omitted. In the first defocus region arrangement portion 30 of the spectacle lens 100 according to example 3, the number of defocus regions 20 included within the 4 mm diameter circle was calculated when the center of the 4 mm diameter circle moved in an equilateral triangle range consisting of the centers of three adjacent defocus regions 20. That is, the number of the defocus regions 20 included in the pupillary range was calculated when the center of the pupil moved in the equilateral triangle range shown in FIG. 8B. In FIG. 8B, T indicates the center of the defocus region 20, and a circle C1 centered at T indicates a region (region Z1A) in which one of the defocus regions 20 is entirely included in the pupillary range. Further, a circle C2 centered at T indicates a region (region Z1B) in which 50% or more of one of the defocus regions 20 is included in the pupillary range. Further, a circle C3 centered at T indicates a region (region Z1C) in which 25% or more of one of the defocus regions 20 is included in the pupillary range. Further, a circle C4 centered at T indicates a region (region Z1) in which one of the defocus regions 20 is included in the pupillary range. Then, the area proportions of the region Z1, the region Z2, the region Z3, the region Z0, the region Z1A, the region Z1B, and the region Z1C in the range of the equilateral triangle were calculated. Table 3 shows the results.

TABLE 3

| Example 3 | | | |
|---|---|---|---|
| | Equilateral triangle area = 14.07 $mm^2$ | | |
| Region | Number of defocus regions in pupillary range | Area ($mm^2$) | Proportion (%) |
| Z0 | 0 | 0 | 0 |
| Z1 | 1 0% or more | 10.039 | 71.3559 |
| Z1C | 25% or more | 8.31 | 59.0643 |
| Z1B | 50% or more | 4.021 | 28.5831 |
| Z1A | 100% | 0.565 | 4.0195 |
| Z2 | 2 | 3.97 | 28.2177 |
| Z3 | 3 | 0.06 | 0.4265 |

As shown in Table 3, in the spectacle lens 100 according to example 3, the area proportion of the region Z1 was 71.3559%, which was sufficiently large. Accordingly, it was confirmed that in the spectacle lens 100 according to example 3, the effect of suppressing the progression of myopia can be efficiently increased. Further, since the spectacle lens 100 according to example 3 includes the second defocus region arrangement portion 40 at a position closer to the center of the lens, it was confirmed that there is a possibility that the influence on the vision through the spectacle lens 100 can be reduced compared to the spectacle lens 100 according to the first and second examples.

Example 4

Figure 9A:
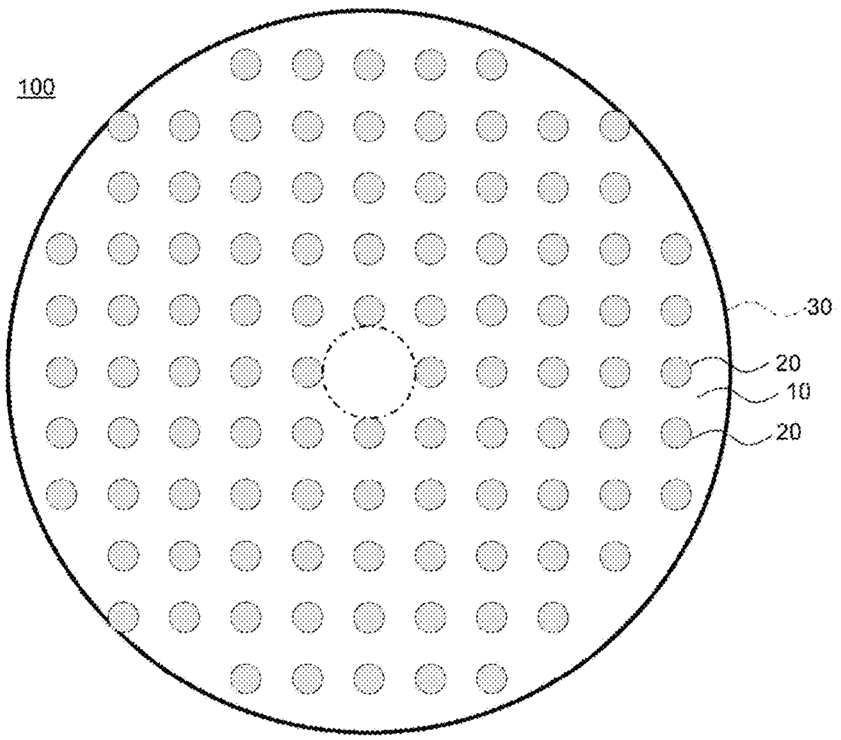
FIG. 9A is a plan view of the object-side surface of the spectacle lens 100 according to example 4.

FIG. 9A is a plan view of the object-side surface of the spectacle lens 100 according to example 4. In example 4, a circumference with a radius of 4.6 mm from the center of the lens and the outer side thereof were defined as the first defocus region placement portion 30. In the first defocus region arrangement portion 30, a plurality of defocus regions 20 were arranged in a square (arrangement such that the center of each defocus region 20 is the vertex of the square), and the shape of each defocus region 20 was spherical. Further, the diameter d of the defocus region 20 was set to 2.8 mm, and the center-to-center distance a between the adjacent defocus regions 20 was set to 6 mm.

Figure 9B:
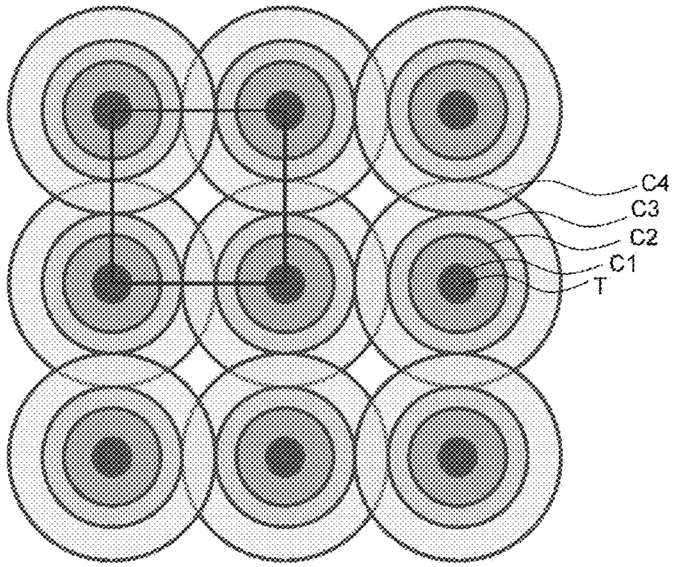
FIG. 9B is an enlarged plan view of the first defocus region arrangement portion 30 of the spectacle lens 100 according to example 4.

FIG. 9B is an enlarged plan view of the first defocus region arrangement portion 30 of the spectacle lens 100 according to example 4. In FIG. 9B, the line indicating the boundary between the base region 10 and the defocus region 20 is omitted. In the first defocus region arrangement portion 30 of the spectacle lens 100 according to example 4, the number of defocus regions 20 included within the 4 mm diameter circle was calculated when the center of the 4 mm diameter circle moved through the square range consisting of the centers of four adjacent defocus regions 20. That is, the number of defocus regions 20 included in the pupillary range was calculated when the center of the pupil moved in the square range shown in FIG. 9B. In FIG. 9B, T indicates the center of the defocus region 20, and a circle C1 centered at T indicates a region (region Z1A) in which one of the defocus regions 20 is entirely included in the pupillary range. Further, a circle C2 centered at T indicates a region (region Z1B) in which 50% or more of one of the defocus regions 20 is included in the pupillary range. Further, a circle C3 centered at T indicates a region (region Z1C) in which 25% or more of one of the defocus regions 20 is included in the pupillary range. Further, a circle C4 centered at T indicates a region (region Z1) in which one of the defocus regions 20 is included in the pupillary range. Then, the area proportions of the region Z1, the region Z2, the region Z3, the region Z0, the region Z1A, the region Z1B, and the region Z1C in the square range were calculated. Table 4 shows the results.

TABLE 4

| Example 4 | | | | |
|---|---|---|---|---|
| | Square area = 32.49 mm$^2$ | | | |
| Region | Number of defocus regions in pupillary range | | Area (mm$^2$) | Proportion (%) |
| Z0 | | 0 | 1.706 | 5.2517 |
| Z1 | 1 | 0% or more | 25.251 | 77.7181 |
| Z1C | | 25% or more | 16.619 | 51.1512 |
| Z1B | | 50% or more | 8.042 | 24.7537 |
| Z1A | | 100% | 1.131 | 3.481 |
| Z2 | | 2 | 5.5331 | 17.0301 |
| Z3 | | 3 | 0 | 0 |

As shown in Table 4, in the spectacle lens 100 according to example 4, the area proportion of the region Z1 was 77.7181%, which was sufficiently large. Accordingly, it was confirmed that in the spectacle lens 100 according to example 4, the effect of suppressing the progression of myopia could be efficiently increased. However, in the spectacle lens 100 according to example 4, the area proportion of the region Z0 was increased compared to the spectacle lens 100 according to examples 1, 2, and 3. Accordingly, it was confirmed that the arrangement mode of the plurality of defocus regions 20 in the first defocus region arrangement portion 30 was preferably an equilateral triangle arrangement rather than a square arrangement, from a viewpoint of reducing the area proportion of the region Z0.

DESCRIPTION OF SIGNS AND NUMERALS

10 Base region
20, 20A, 20B Defocus region
30 first defocus region arrangement portion
40 Second defocus region arrangement portion
100 spectacle lens

The invention claimed is:

1. A spectacle lens, comprising:

a base region where a light flux incident from an object-side surface is emitted from an eyeball-side surface and converges on a retina through an eyeball;

a plurality of defocus regions in contact with the base region and having a property that the light flux passing through at least a part of the defocus region is incident on a retina as a divergent light; and a first defocus region arrangement portion in which the plurality of defocus regions are arranged in such a manner that a 4 mm diameter circle including at least a portion of one defocus region but not including any portion of an adjacent defocus region exists in a planar view of the object-side surface, wherein the first defocus region arrangement portion is provided on a periphery of the spectacle lens, the first defocus region arrangement portion surrounds a center portion of the spectacle lens where the defocus region is not formed, in the first defocus region arrangement portion, when a region formed by center positions of 4 mm diameter circles including only one defocus region is defined as region Z1 in the planar view of the object-side surface, an area of the region Z1 is 25% or more of an area of the first defocus region arrangement portion, and in the planar view of the object-side surface, the first defocus region arrangement portion is a portion enclosed by a circumference of a first circle centered on the lens center of the spectacle lens and having a smallest diameter among circles centered on the lens center of the spectacle lens contacting one of the plurality of defocus regions, and a circumference of a second circle centered on the lens center and having a largest diameter among the circles centered on the lens center of the spectacle lens contacting one of the plurality of defocus regions.

2. The spectacle lens according to claim 1, wherein the area of the region Z1 is 50% or more of the area of the first defocus region arrangement portion.

3. The spectacle lens according to claim 2, wherein in the first defocus region arrangement portion, the diameter d of the defocus region is 1.5 mm or more and 3 mm or less.

4. The spectacle lens according to claim 2, wherein in the first defocus region arrangement portion, the center-to-center distance a between the adjacent defocus regions is more than 3 mm and less than 7 mm.

5. The spectacle lens according to claim 2, wherein the spectacle lens is a myopia progression suppressing lens.

6. The spectacle lens according to claim 1, wherein in the first defocus region arrangement portion, a center-to-center distance a between the adjacent defocus regions and a diameter d of the defocus region satisfy (d+4 mm)/2<a<d+4 mm.

7. The spectacle lens according to claim 6, wherein in the first defocus region arrangement portion, the diameter d of the defocus region is 1.5 mm or more and 3 mm or less.

8. The spectacle lens according to claim 6, wherein in the first defocus region arrangement portion, the center-to-center distance a between the adjacent defocus regions is more than 3 mm and less than 7 mm.

9. The spectacle lens according to claim 6, wherein the spectacle lens is a myopia progression suppressing lens.

10. The spectacle lens according to claim 1, wherein in the first defocus region arrangement portion, the diameter d of the defocus region is 1.5 mm or more and 3 mm or less.

11. The spectacle lens according to claim 1, wherein in the first defocus region arrangement portion, the center-to-center distance a between the adjacent defocus regions is more than 3 mm and less than 7 mm.

12. The spectacle lens according to claim 1, wherein the spectacle lens is a myopia progression suppressing lens.

13. The spectacle lens according to claim 1, wherein the periphery of the spectacle lens is a circumference of 10 mm in diameter from the center of the lens and a region outside thereof in the planar view of the object-side surface of the spectacle lens.

14. A method for designing a spectacle lens including a base region where a light flux incident from an object-side surface is emitted from an eyeball-side surface and converges on a retina through an eyeball; and a plurality of defocus regions in contact with the base region and having a property that the light flux passing through at least a part of the defocus region is incident on a retina as a divergent light, the method comprising:

arranging the plurality of defocus regions in a first defocus region arrangement portion in such a manner that a 4 mm diameter circle including at least a portion of one defocus region but not including any portion of an adjacent defocus region exists in a planar view of the object-side surface, wherein the first defocus region arrangement portion is provided on a periphery of the spectacle lens, the first defocus region arrangement portion surrounds a center portion of the spectacle lens where the defocus region is not formed, in the first defocus region arrangement portion, when a region formed by center positions of 4 mm diameter circles including only one defocus region is defined as region Z1 in a planar view of the object-side surface, an area of the region Z1 is 25% or more of an area of the first defocus region arrangement portion, and in the planar view of the object-side surface, the first defocus region arrangement portion is a portion enclosed by a circumference of a first circle centered on the lens center of the spectacle lens and having a smallest diameter among circles centered on the lens center of the spectacle lens contacting one of the plurality of defocus regions, and a circumference of a second circle centered on the lens center and having a largest diameter among circles centered on the lens center of the spectacle lens contacting one of the plurality of defocus regions.

* * * * *